US010007918B1

(12) United States Patent
Cox et al.

(10) Patent No.: US 10,007,918 B1
(45) Date of Patent: Jun. 26, 2018

(54) CUSTOMER CARE AUTOMATION SYSTEM

(71) Applicant: Sprint Communications Company L.P., Overland Park, KS (US)

(72) Inventors: Jamal Cox, Wilmington, DE (US); Matthew Henderson, Overland Park, KS (US); Lisa Hilger, Charlotte, NC (US)

(73) Assignee: Sprint Communications Company L.P., Overland Park, KS (US)

( * ) Notice: Subject to any disclaimer, the term of this patent is extended or adjusted under 35 U.S.C. 154(b) by 616 days.

(21) Appl. No.: 14/583,582

(22) Filed: Dec. 26, 2014

(51) Int. Cl.
  *G06Q 30/00* (2012.01)
  *G06Q 10/06* (2012.01)

(52) U.S. Cl.
  CPC ..... *G06Q 30/016* (2013.01); *G06Q 10/06314* (2013.01); *G06Q 10/063112* (2013.01)

(58) Field of Classification Search
  CPC ......... G06Q 30/016; G06Q 10/063112; G06Q 10/06314
  USPC ...................................................... 705/7.14
  See application file for complete search history.

(56) References Cited

U.S. PATENT DOCUMENTS

| | | | | |
|---|---|---|---|---|
| 5,301,270 A * | 4/1994 | Steinberg | ............ | G06F 8/20 715/866 |
| 7,266,499 B2 * | 9/2007 | Surace | ............ | G10L 13/033 704/270 |
| 8,910,067 B1 * | 12/2014 | Anderson | ............ | G06F 3/04817 715/744 |
| 9,390,706 B2 * | 7/2016 | Gustafson | ............ | G10L 13/043 |
| 2004/0101127 A1 * | 5/2004 | Dezonno | ............ | H04M 3/523 379/265.02 |
| 2007/0209013 A1 * | 9/2007 | Ramsey | ............ | G06F 17/30893 715/769 |
| 2010/0020959 A1 * | 1/2010 | Spottiswoode | ..... | H04M 3/5232 379/265.1 |
| 2010/0131482 A1 * | 5/2010 | Linthicum | .......... | G06F 19/3406 707/706 |
| 2010/0305999 A1 * | 12/2010 | Fujioka | .................. | G06Q 30/02 705/14.45 |
| 2011/0137696 A1 * | 6/2011 | Meyer | .................... | G06Q 10/00 705/7.13 |

(Continued)

OTHER PUBLICATIONS

M. McRorie, I. Sneddon, G. McKeown, E. Bevacqua, E. de Sevin and C. Pelachaud, "Evaluation of Four Designed Virtual Agent Personalities," in IEEE Transactions on Affective Computing, vol. 3, No. 3, pp. 311-322, Jul.-Sep. 2012.*

(Continued)

*Primary Examiner* — Jonathan G Sterrett
*Assistant Examiner* — Hector Leal (57) ABSTRACT

A method of performing a customer service operation with user interface (UI) element widgets is disclosed. The method comprises an application of an evaluation server receiving inputs that are responses to a survey of a user of a workstation. The method comprises the application determining a personality type and a technical ability level of the user. The method comprises the application receiving a request for a widget, wherein the widget provides the functionality to complete the user request that is related to an issue that the user wants to resolve. The application automatically selects a widget from a plurality of widgets based on the type of user request and the technical ability level of the user. The application then transmits the widget to the user.

9 Claims, 4 Drawing Sheets

(56) References Cited

U.S. PATENT DOCUMENTS

| | | | |
|---|---|---|---|
| 2014/0108970 A1* | 4/2014 | Syu | G06F 3/048 |
| | | | 715/760 |
| 2014/0136424 A1* | 5/2014 | Nakkana | G06Q 30/016 |
| | | | 705/304 |
| 2014/0164257 A1* | 6/2014 | Brown | G06Q 30/016 |
| | | | 705/304 |
| 2015/0227299 A1* | 8/2015 | Pourshahid | G06F 3/04847 |
| | | | 715/771 |
| 2016/0142541 A1* | 5/2016 | Sharpe | H04M 3/5141 |
| | | | 379/92.01 |
| 2016/0162905 A1* | 6/2016 | Singh | G06F 21/31 |
| | | | 705/304 |

OTHER PUBLICATIONS

D. Voth, "Practical agents help out [virtual agent system]," in IEEE Intelligent Systems, vol. 20, No. 2, pp. 4-6, Mar.-Apr. 2005.*

Y. Mochizuki, K. Senda, K. Orimoto, J. Tagawa and S. Asahara, "Humanoid agent for communication and entertainment driven by emotion and "Kansei" in embedded system," First IEEE Consumer Communications and Networking Conference, 2004. CCNC 2004., Las Vegas, NV, USA, 2004, pp. 551-556.*

Y. Kang, A. H. Tan and F. F. H. Nah, "Agent-Based Virtual Humans in Co-Space: An Evaluative Study," 2012 IEEE/WIC/ACM International Conferences on Web Intelligence and Intelligent Agent Technology, Macau, 2012, pp. 59-66.*

* cited by examiner

CUSTOMER CARE AUTOMATION SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Service providers, for example, telecommunications service providers, may receive thousands upon thousands of service requests from customers. Customers may receive customer care service from the telecommunication service provider in several ways that may comprise visiting a web site that provides customer care from the telecommunication service provider, visiting a retail store of the telecommunication service provider, and calling into a customer care hotline of the telecommunication service provider. Customers may consult customer care for many reasons that may comprise one or more of broken screens on their mobile communication devices, transferring of contacts from one mobile communication device to another, changing their current service to another, changing their current plan to another plan, discussing bills received, dropped calls, out-of-country service options, dropping or adding a line to their service, and others. Telecommunications service providers may wish to address these issues as quickly and efficiently as possible.

SUMMARY

In an embodiment, a method of performing a customer service operation with user interface (UI) element widgets is disclosed. The method comprises an application of an evaluation server receiving a first set of inputs, wherein the inputs are responses to a survey of a customer. The method further comprises the application determining a personality type and a technical ability level of the customer, based at least in part on the first set of inputs to the survey. The method further comprises the application of the evaluation server receiving a second set of inputs, wherein the inputs are that of a survey of a customer service agent. The method further comprises the application determining a personality type of the customer service agent, based at least in part on the second set of inputs. The method further comprises the application receiving a customer request, wherein the customer request is related to an issue that the customer wants to resolve. The method further comprises the application automatically matching the customer with the agent based on personality types. The method further comprises the application automatically choosing a widget that matches the customer request based on the issue that the customer wants to resolve, wherein the widget is a UI that is located in another UI, wherein the widget provides functionality to complete the customer request. The method further comprises the application completing the customer request via the widget.

In an embodiment, a method of performing a self-service operation request with user interface (UI) element widgets is disclosed. The method comprises an application of an evaluation server receiving inputs, wherein the inputs are responses to a survey of a user of a workstation, wherein the survey is presented in a customer service web page. The method further comprises the application determining a personality type and a technical ability level of the user, based at least in part on the inputs to the survey. The method further comprises the application via the customer service web page receiving a user request for a widget, wherein the widget is a UI that is located in another UI, wherein the widget provides the functionality to complete the user request, wherein the user request is related to an issue that the user wants to resolve. The method further comprises the application selecting a widget from a plurality of widgets based on the technical ability level of the user, and the type of user request. The method further comprises the application sending the selected widget via the customer service web page.

In an embodiment, a method of performing a customer service operation with user interface (UI) element widgets is disclosed. The method comprises an application of an evaluation server receiving a first set of inputs, wherein the inputs are responses to a survey of customers. The method further comprises the application determining personality types and technical ability levels of the customer, based at least in part of the first set of inputs to the survey. The method further comprises the application of the evaluation server receiving a second set of inputs, wherein the inputs are responses to a survey of customer service agents. The method further comprises the application determining personality types of the customer service agents, based at least in part on the second set of inputs. The method further comprises the application determining a first preferred match of each of the customer personality types to the agent personality types. The method further comprises the application performing customer service based on matching a first pre-defined fraction of customers to agents using the preferred matches and matching a second pre-defined fraction of customers to agents using matches that are not preferred matches. The method further comprises the application measuring success of customer service for preferred matches and non-preferred matches. The method further comprises the application adapting matches between customer types and agent types based on the success measure of the matches.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Customer service centers may receive hundreds of thousands of calls per day. Customer service centers may wish to make the resolution of issues as efficient and swift as possible so that they do not become slow in their resolution of customer service issues and so customers remain pleased with their services. In addition, when customers contact the customer service center, they may be paired with customer service agents of different, non-corresponding personality types which may sometimes result in undesired and avoidable tension between customers and customer service agents.

The present disclosure teaches an application that automatically selects widgets with pre-programmed functionality to solve particular customer issues from among a larger collection of widgets to resolve customer issues as they occur. A widget is a UI that is located in another UI. For example, a widget may be a pop-up window with pre-programmed functionality to facilitate proactive payment of a mobile communication services bill on a customer service web page. These widgets may match issues that the customer may want to resolve and may be used by both the customer to resolve an issue in a self-service manner and by the customer service agent when a customer contacts the customer service center. When a customer calls the customer service center, the application may also automatically select a customer service agent with a personality type that corresponds to a personality type of the customer.

In an embodiment, an application of an evaluation server receives a first set of inputs that are responses to a survey of a customer. The survey may be administered at several time periods that may comprise one or more of when the customer first calls into the customer service center, as the customer finishes a service request, during the service request, and other times. The survey may be administered during a delay while the customer waits to get in contact with a customer service agent. The survey may also be administered after a purposeful delay has been set so that the customer may take the survey. Based at least in part on the first set of inputs to the survey, the application determines a personality type and a technical ability level of the customer. The application also receives a second set of inputs that are responses to a survey of a customer service agent. The application determines the personality type of the customer service agent so that he or she may be matched with customers of corresponding personality types.

As used herein, 'corresponding personality type' refers to a preferred match between a personality type of a customer service agent and a personality type of a customer. Such a correspondence of personality types may involve the same personality type, but it need not. For example, hypothetically, it may be that a customer service agent with a dreamer personality type is a preferred match to a customer also having a dreamer personality type. On the other hand, it may be that a customer service agent with a dreamer personality type is a poor match to a customer also having a dreamer personality type. This match, to the contrary, may result in poor customer service being provided. It may be that, given a customer having a dreamer personality type, the preferred match—the corresponding personality type—would be a customer service agent having a strategist personality type. It is contemplated that such preferred matches may be identified by analyzing data.

The application receives a customer request which is related to an issue that the customer wants to resolve. The application determines and evaluates the customer's personality type and automatically matches the customer with a customer service agent of a corresponding personality type. In an embodiment, the personality type of the customer may be previously determined and stored to an information data store that the application may access when it wants to find out the personality type of the customer. In an embodiment, there may be six personality types that may comprise a planner personality type, an innovator personality type, a dreamer personality type, a motivator personality type, a risk taker personality type, and a strategist personality type. In an example of the application matching a customer to a customer service agent of a corresponding personality type, the application may match a dreamer customer with an agent who has a planner personality type or motivator personality type. In an embodiment, the application automatically chooses a widget that matches the customer request. In an embodiment, there are a plurality of widgets that are optimized to complete particular issues. In an embodiment, the issues may be related to telecommunication service provider issues. These issues may comprise one or more of a phone return, communication network performance issues, device activation, proactive bill payment, and other issues.

In an embodiment, the customer may be able to use the conflict resolving widgets in a self-service method/manner at his or her own convenience. The application may determine a personality type and a technical ability level based on a survey that the customer takes. When the application receives a request via a customer service web page for a widget to resolve an issue, the application automatically selects a widget that corresponds with the customer issue. In an embodiment, the presentation of the widget may depend on the technical ability level of the customer. If the customer has a low technical ability level, the widget may be displayed with content that is technologically simple to understand for the customer. If the customer has a high technical ability level, the widget may be displayed with content that is technologically complex but easy to understand for the customer with a high technical ability level. The technologically complex but easy to understand widgets for a customer of a high technical ability level may leave out obvious suggestions to issues such as rebooting a device or checking a battery charge of a device; obvious solutions such as these may appear in the technologically simple widgets. In an embodiment, there may be multiple widgets sent to the customer. Depending on the technical ability level of the customer, the widgets may be sent in ascending or descending order of complexity. For example, a customer with a high technical ability level may be sent 2 widgets, 1 that for example is ranked a 10/10 in difficulty and another widget that is ranked a 4/10 difficulty to understand. For the customer with a high technical ability level, the widget that is a 10/10 difficulty to understand may be presented to the customer first, followed by the 4/10 widget if the first widget does not work.

In an embodiment, the application may match customers and customer service agents of different, non-corresponding personality types in scenarios where customers contact the customer service center using their phones. Non-corresponding personality types are personality types that are believed to be personality types that would not work well or would not work optimally with each other in communication. The application may match a pre-defined fraction of customer service requests to gather data in order to measure the success of interactions between customers and customer service agents of non-corresponding personality types. The data from these interactions may be gathered using post-surveys of the service request where the customer may detail how they felt about the interaction with the customer service agent of a non-corresponding personality type. The application may compile and use this information to adapt matches between customer and customer service agent personality types so that it may know which personality types work well with together and which personality types do not work well together. The application may determine that some of the non-corresponding personality types (e.g., previously thought to be non-corresponding personality types) do work well with customers, and are therefore defined, going forwards, as complementary personality types (e.g., corresponding personality types). In an embodiment, the application may match customers with customer service agents of complementary personality types as opposed to corresponding personality types. This may be distinguished by matching the customer with customer service agents of non-corresponding personality types and discovering which personality types work well over the phone, but not the best. The application may do this so that in case a call center becomes extremely busy and does not have a corresponding personality type customer service agent to match with a customer, it may match the customer with a customer service agent of a complementary personality type.

With the application that automatically selects widgets to resolve customer service issues based on the type of issue, conflicts may be resolved quickly and efficiently. The application may improve the experience of the customer when they contact the customer service center by automatically matching the customer with a customer service agent of a corresponding or complementary personality type.

Figure 1:
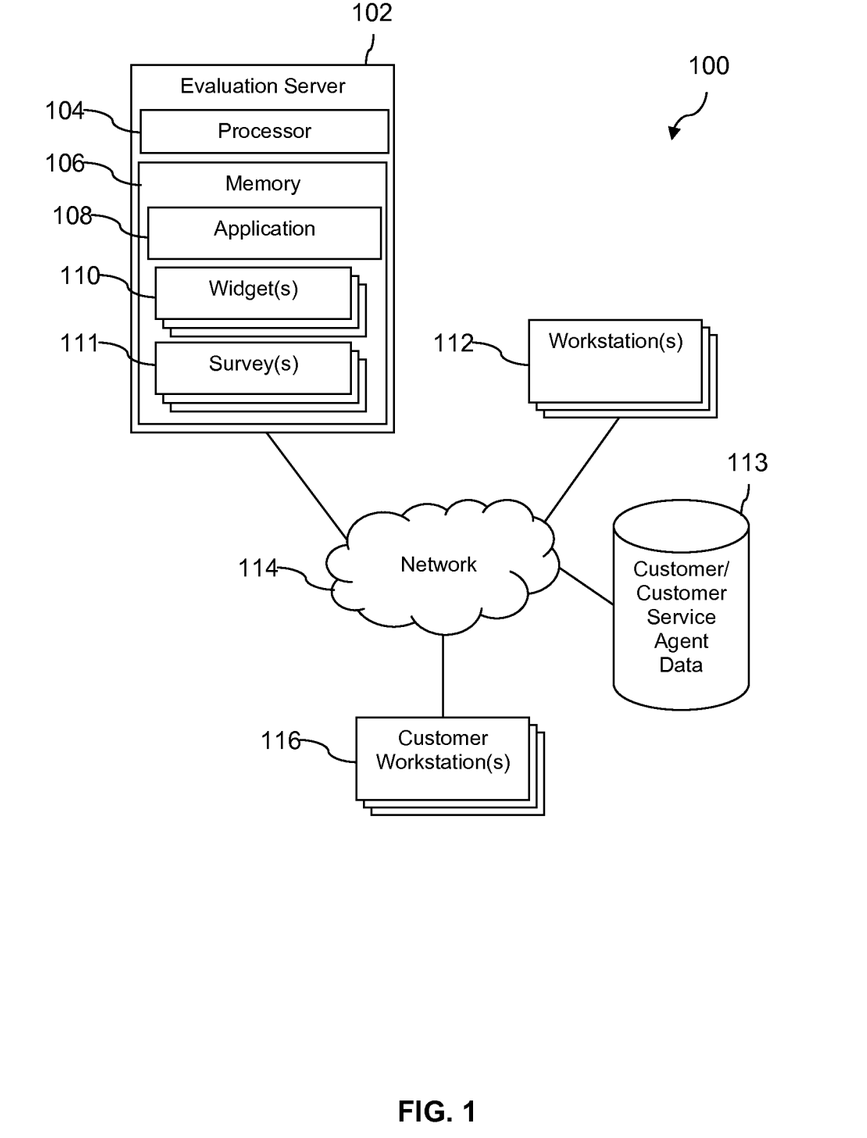
FIG. 1 is a block diagram of a system according to an embodiment of the disclosure.

Turning now to FIG. 1, a system 100 is described. The system 100 comprises an evaluation server 102, a plurality of workstations 112, a network 114, a customer/customer service agent information data store 113, and a plurality of customer workstations 116. The evaluation server 102 further comprises a processor 104, a memory 106, an application 108, and a plurality of widgets 110 and a plurality of surveys 111 stored to the memory 106. In an embodiment, the plurality of surveys 111 may be stored to a separate data store.

The evaluation server 102 receives requests from customers and customer service agents and selects user interface (UI) widgets 110 from the plurality of widgets 110 that help resolve customer service requests. In an embodiment, the evaluation server 102 may be associated with a telecommunication service provider. The plurality of workstations 112 may be used by customer service agents in a call center who may receive customer service requests from the phone calls. In an embodiment, the plurality of workstations 112 may be located at a customer service center. The plurality of customer workstations 116 may be used by customers who access a customer care web page that displays widgets 110 that resolve issues that the customers may experience. In an embodiment the customer workstations 116 may be personal computers (PCs), mobile communication devices, and other devices that provide functionality to contact the plurality of workstations 112 or the evaluation server 102 and receive widgets 110 and display the widgets 110. In an embodiment, the issues that customers may want to resolve may comprise network issues, phone returns, mobile communication device activations, and proactive bill payment and other issues. The evaluation server 102 may also administer surveys 111 from the plurality of surveys 111 to the customer service agents and customers. These surveys 111 may be used by the evaluation server 102 to determine personality types of customers and customer service agents and to determine technical ability levels of customers.

Using inputs received from the plurality of surveys 111, the evaluation server 102 may evaluate the surveys to identify the personality type of the customers and customer service agents in order to match customer's personality type with a customer service agent that has a corresponding personality type. In an embodiment, the personality type of a customer and/or a customer service agent may be determined using an algorithm that uses a series of data points, e.g., location, age, gender, education level, Myers Briggs personality test results, and other data points. In an embodiment, corresponding personality types are two personality types that are generally believed to benefit the other in the customer care context. The evaluation server 102 may match the customer with a customer service agent of a corresponding personality type when a customer contacts a customer service center in order to make a customer's experience while communicating with the customer service agent easier and less tedious. The evaluation server 102 may calculate the technical ability level of the customer in order to determine the type of widget 110 to select from the plurality of widgets 110 and send to the customer. In an embodiment, a widget 110 may be a UI that is located in another UI. For example, a widget 110 may be a pop-up window with pre-programmed functionality selected from among a larger collection of widgets 110 to facilitate proactive payment of a mobile communication services bill on a customer service web page. These widgets 110 may match issues that the customer may want to resolve and may be used by both the customer via the customer workstations 116 to resolve an issue in a self-service manner, and the customer service agent via the workstations 112 when a customer contacts the customer service center. In an embodiment, the evaluation server 102 may select and send a simpler widget 110 or a more complex widget 110 to the customer depending on his or her technical ability level when a customer opts to resolve an issue in a self-service manner.

The plurality of workstations 112 may be associated with customer service agents that may be located at a customer service call center. The plurality of workstations 112 may be desktop computers, laptop computers, or other devices that aid the customer service agents in their resolution of service requests received from customers. The customer/customer service agent information data store 113 may comprise information about customers that contact the customer service center and the customer service agents that resolve customer requests. The information in the customer/customer service agent information data store 113 may comprise a name of a customer, an age of the customer, an address of the customer, a personality type of the customer if they have taken the survey 111, a technical ability level of the customer if they have taken the survey 111, a history of past events that may comprise network issues, phone returns, mobile communication device activations bill payments, and other information. The customer/customer service agent information data store 113 may also comprise information about the customer service agents which may comprise a name of the customer service agent, an age of the customer service agent, a personality type of the customer service agent, and a history of past resolutions of customer requests by the customer service agent. The network 114 may be a private communication network, a public communication network, or a combination thereof. The evaluation server 102, the plurality of workstations 112, the customer/customer service agent information data store 113, and the plurality of customer workstations 116 may be communicatively coupled to the network 114.

In an embodiment, the application 108 of the evaluation server 102 receives a first set of inputs, wherein the inputs are responses to a survey 111 of a customer. The customer may be queried by the evaluation server 102 during a time that the customer calls the customer care service call center. The application 108 determines a personality type and a technical ability level of the customer, based at least in part on the first set of inputs to the survey 111. The application 108 receives a second set of inputs, wherein the second set of inputs are that of a survey 111 of a customer service agent. The application 108 determines a personality type of the customer service agent, based at least in part on the second set of inputs to the survey 111.

In an embodiment there may be six or more personality types. Six or more of the personality types may comprise a planner personality type, an innovator personality type, a dreamer personality type, a motivator personality type, risk taker personality type, a strategist personality type, or other personality types. The personality type of a customer and/or a customer service agent may be determined using an algorithm that uses a series of data points, e.g., location, age, gender, education level, Myers Briggs personality test results, and other data points.

In an embodiment, a planner personality type may be associated to a customer or customer service agent that is inclined to analyze situations and develop a detailed tactical plan for the specific situation. An innovator personality type may be associated to a customer or customer service agent that is inclined to be an outside of the box thinker who does the work to achieve his or her goals. A dreamer personality type may be associated to a customer or customer service agent that is an outside of the box thinker who is less action oriented than an individual of an innovator personality or planner personality type. A motivator personality type may be associated to a customer or customer service agent that is an outspoken leader who quickly evaluates and takes command of his or her environment. A risk taker personality type may be associated to a customer or customer service agent who is focused on getting things done, perhaps in an impatient manner, and is willing to try something quickly without having all the facts. A customer/customer service agent with a risk taker personality type may be willing to innovate and fail fast. A strategist personality type may be associated to a customer or customer service agent who analyzes situations and develops a higher level strategic plan for the specific situation and perhaps succeeding situations.

In an embodiment, the evaluation server 102 may match customers with customer service agents of a corresponding personality type in order to promote improved resolution of customer issues. In some contexts, the system 100 may comprise an improved customer care system and/or an improved automated call direction system. It may be beneficial for customers to be matched with customer service agents of a corresponding personality type as opposed to the same or non-corresponding personality type as a customer service agent of a corresponding personality type may be able to promote a behavior that a customer has a deficiency or weakness in. For example, a dreamer personality type customer may be paired with a planner or motivator personality type customer service agent.

The planner or motivator personality type customer service agent may be able to help a dreamer personality type customer follow through with a solution and do so in a manner that motivates the dreamer personality type customer to follow through with his or her other goals. In another example, the evaluation server 102 may pair a risk taker personality type customer with a strategist personality type customer service agent. The strategist personality type customer service agent may be able to help and advise the risk taker personality type customer to a resolution of his or her issue and avoid doing so in a manner that would result in unintended consequences because the risk taker personality type customer performed a task without having all of the facts. For example, the risk taker personality type customer may want to do a phone return and the strategist personality type customer service agent may inform the customer that he or she may be able to receive a credit that may go towards the purchase of a new phone after he or she has returned the old phone. The risk taker customer, on his or her own, may have returned the phone without receiving the credit that could go towards a new phone because he or she did not take the time to learn all of the facts that were associated with a phone return.

In another example, a planner customer may be optimally paired with a motivator customer service agent. The motivator personality type customer service agent may be able to inspire the planner personality type customer to accomplish whatever task they are trying to complete. In another example, an innovator personality type customer may be optimally paired with a planner customer service agent. The planner personality type customer service agent may be able to help the innovator personality type customer to compile and execute a plan that will help the innovator personality type customer accomplish his or her goal. In another example, a strategist customer may be paired with a planner agent. The planner personality type customer service agent may be able to help the strategist with further planning input so that the strategist personality type customer may accomplish his or her goal.

The technical ability level score of a customer may be calculated by the evaluation server 102 via the application 108 using an algorithm that uses a series of data points that may comprise previous interactions, call reasons, call results (resolved or unresolved), years of familiarity with the technology related to the call reason, and technology questions to determine the overall technical ability score/level. The technical ability level score may also be calculated using three or more categories that are further comprised of multiple sub-categories. The three or more categories may comprise a channel by which a customer accesses technology and the internet, a device operating system that the customer uses on his or her device, and the make of the device that the customer uses.

The channel category may have several sub-categories that may comprise a web site/web browser that the customer uses to access the internet, for example Internet Explorer, Google Chrome, and other web browsers, wherein each different web browser is a sub-category. Channel sub-categories may further comprise a device that the customer uses such as a mobile phone or a tablet computer. Channel sub-categories may further comprise familiarity with chat websites, familiarity with interactive voice response for example, SIRI of the iPhone, and familiarity and use of social media outlets such as Facebook, Twitter, and other social media outlets, wherein each social media outlet is its own sub category.

Another of the three categories may comprise the device operating system (OS) that the customer uses, such as an Android OS, iOS of Apple, a Blackberry OS, and other OSs, wherein each OS version of Android, iOS, Blackberry OS, and the other operating systems may be its own subcategory. Another of the three or more categories may comprise the make of the device that the customer uses. For example, Samsung devices, Apple devices, and other devices, wherein each device of Samsung, Apple, and the other devices may be a sub-category of its own, for example the Samsung Galaxy S5 and the Apple iPhone 5 and 5S.

The scores may vary from a range of 1-10, wherein a score/level of 1 represents a person that is not technologically savvy and a score/level of 10 represents a person that is technologically savvy. In an embodiment, the technical ability scores/levels may be organized and placed into a percentile or quartile system or other systems using a weighted sum of factors by the evaluation server 102. Factors that may be evaluated by the evaluation server 102 to evaluate technical ability level may also comprise: a preferred web browser of the customer, types of devices that the customer owns, for example a phone, the operating system of the device, and the maker of the device. The evaluation server 102 may place a certain weight on each factor to equal a particular sum in order to determine a technical ability score/level and place the customer within a quartile hierarchy. In an embodiment, the sum of the weighted factors may be defined in a range of 0-100, or other ranges.

When the customer contacts the customer service center, the application 108 identifies the customer's contact reason, and looks into previous interaction history, if any, by referring to the customer/customer service agent information data store 113. With the information, the evaluation server 102 via the application 108 matches a customer with a customer service agent that has a corresponding personality type and directs the customer call to that customer service agent for resolution of the issue. After matching the customer with the customer service agent of a corresponding personality type, the evaluation server 102 via the application 108 automatically selects a widget 110 that corresponds with the issue that the customer wants to resolve and sends the widget 110 to the customer service agent at the workstation 112. The customer request is completed by the customer service agent via the application 108.

In an embodiment, the customer may be able to resolve an issue that he or she may have in a self-service method. The customer may use a self-help web page to resolve his or her issue via the customer workstation 116. Like the customer service agent assisted method, the customer receives a widget 110, but rather than being optimized for the use by the customer service agent to resolve the issue, the widget 110 is optimized for the customer to resolve the issue on his or her own. The customer via the customer workstation 116 may contact the customer service center which is associated with the evaluation server 102. The evaluation server 102 may identify the issue that the customer wants to resolve, for example, a phone return. The evaluation server 102 may look up a previous interaction history of the customer by accessing the customer/customer service agent information data store 113. The evaluation server 102 may determine if the customer has contacted the customer service center recently about returning a phone, and also determine if the phone return has already been requested or even performed. The evaluation server 102 determines when voice and/or data were last used on the phone as well. Then evaluation server 102 also determines the customer's end type UI, the customer's UI size, and which channel the customer is using to complete the self-service request. The customer's end type UI and customer's UI size may be in reference to display or device display through which the customer may be able to see his or her received widget. In an embodiment, the information that determines the customers end type UI, UI size, and channel is sent in the initial contact message from the customer via the customer workstation 116. The evaluation server 102 uses this information to be able to format the widget 110 so that it is optimal for viewing for the customer on a display of the customer workstation 116.

The evaluation server 102 via the application 108 may determine the customer's technical ability score/level. If the customer does not have a technical ability score, the evaluation server 102 may administer a survey for the customer to take so as to determine the customers technical ability score/level. In an embodiment, if the customer has a low technical ability level, for example, a 3, the evaluation server 102 may select a technically simplified widget to solve the customer's issue. With the technical ability level determined and the formatting information for the widget 110, the evaluation server 102 selects a widget 110 from the plurality of widgets 110. The widget 110 best matches the customer's request/issue, technical ability level, UI size, and other factors and sends the selected widget 110 to the customer which is displayed on a display of the customer workstation 116.

In an embodiment, the widgets 110 may be classified or ranked depending on how technologically simple or complex they are. For example, there may be a level 3 widget 110 that would be simple for a customer with a technical ability level of 3 to understand. In another example, there may be a level 10 widget 110 that would be simple for a customer with a technical ability level of 10 to understand. The widgets 110 may also be ranked according to how difficult they are to perform. For example, a system reboot of a mobile phone may be a level 1 widget 110, and a virus removal on a mobile phone without using virus removal software may be a level 10 widget. In an embodiment, the evaluation server 102 may send several widgets to the customer of varying difficulties to understand depending on the customer's technical ability level. For example, a customer with a low technical ability level may be sent three widgets 110 that are ranked 2, 4, and 10. The evaluation server 102 would present these widgets 110 to the customer in an ascending order: 2, 4, and 10. The evaluation server 102 may do this in case the customer is unable to solve his or her problem using a lower level widget 110.

In an embodiment, the evaluation server 102 via the application 108 may administer a post-survey 111 to the customer in order to evaluate how satisfactory the customer found the self-service method or agent assisted method were. The evaluation server 102 may do this in order to improve widgets 110 that are sent to the customer in a self-service method or to improve personality type matching of customers and customer service agents in the agent assisted method. The evaluation server 102 may also monitor how long it took for the customer's issue to be resolved and use this information to evaluate the success of the widget 110 in the self-service method and/or the customer service agent in the agent assisted method. The success of the widget 110 or the agent could be dependent on the issue that the customer wants to resolve. The evaluation server 102 evaluates satisfaction of the customer via the post-survey 111. This information is evaluated and is given a score that is called a net promoter score. The net promoter score is related to the satisfaction of the customer and may help determine how likely a customer is to promote that the assistance provided was satisfactory.

In an embodiment, the evaluation server 102 may match the customer with a customer service agent of a non-corresponding personality type in order to gather data to determine which personality types work well with each other and which personality types do not work well each other. In an embodiment, non-corresponding personality types are personality types that are believed to be personality types that would not work well or would not work optimally with each other in communication. Evaluating these interactions may provide data that can promote adaptation of the matching algorithm so that the system 100 may work optimally. The evaluation server 102 may perform this method by matching a predefined fraction of customers who opt to resolve an issue by using agent assistance to a predefined fraction of customer service agents of non-corresponding personality types. In an embodiment, the predefined fraction of customer and customer service agents may be expressed as a percentage. The predefined percentage of customers/customer service agents selected to be matched with a non-corresponding personality type customer/customer service agent may be 1 percent, 5 percent, or another percentage of customers who contact the customer service center. The evaluation server 102 may measure the success of the non-preferred customer/customer service agent matches using a post-survey 111 from the plurality of surveys 111. The results from the post-survey 111 give the evaluation server 102 numerical information that it may use when making new matches. Using the satisfaction rating determined from the surveys 111, the evaluation server 102 may adapt future matches between customer personality types and customer service agent personality types based on the success measure of the matches.

Figure 2:
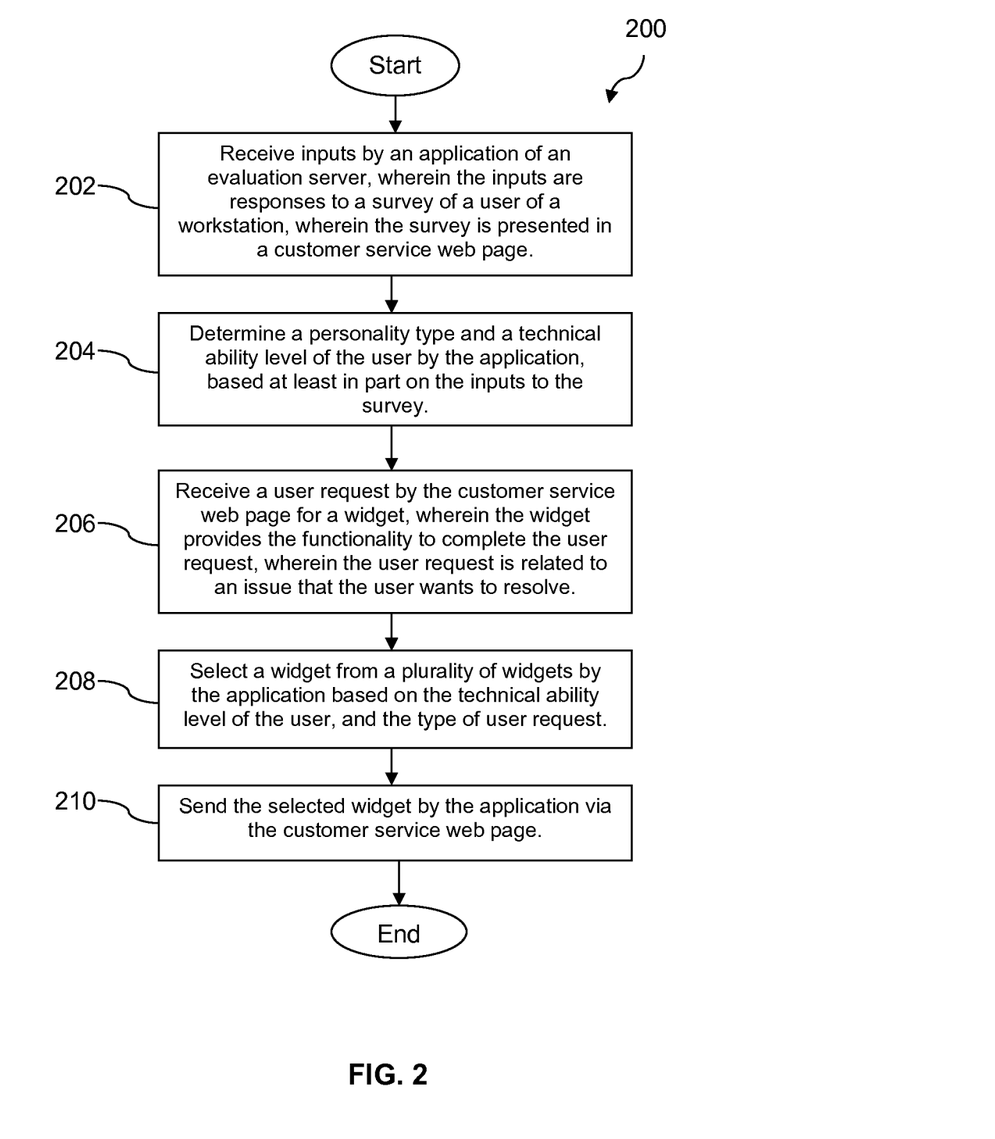
FIG. 2 is a flow chart of a method according to an embodiment of the disclosure.

In FIG. 2, a method 200 is described. At block 202, an application of an evaluation server receives inputs, wherein the inputs are responses to a survey of a user of a workstation, wherein the survey is presented in a customer service web page. At block 204, the application determines a personality type and a technical ability level of the user, based at least in part on the inputs to the survey. At block 206, the customer service web page receives a user request for a widget, wherein the widget provides the functionality to complete the user request, wherein the user request is related to an issue that the user wants to resolve. At block 208, the application selects a widget from a plurality of widgets based on the technical ability level of the user, and the type of user request. At block 210, the application sends the selected widget via the customer service web page.

Figure 3:
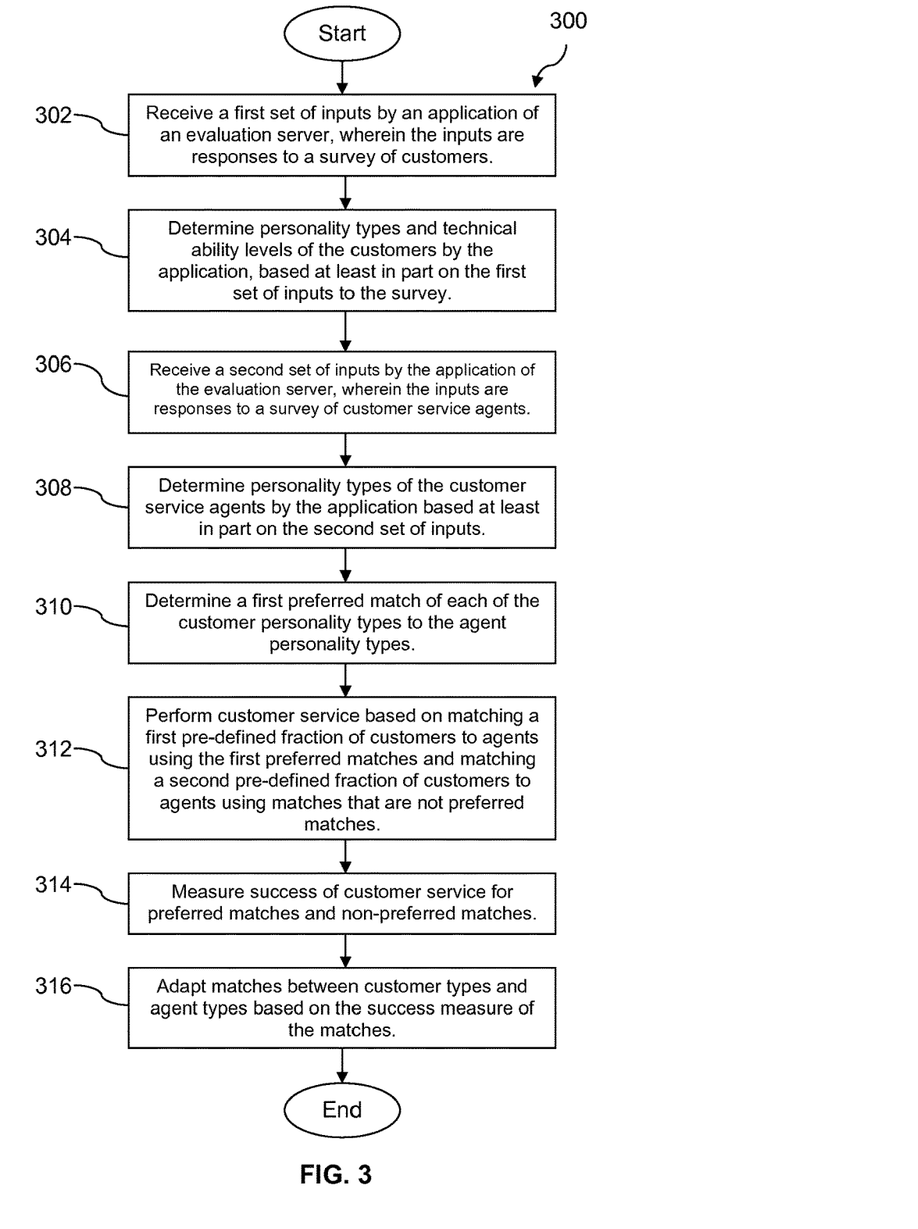
FIG. 3 is a flow chart of a method according to an embodiment of the disclosure.

In FIG. 3, a method 300 is described. At block 302, an application of an evaluation server receives a first set of inputs, wherein the inputs are responses to a survey of customers. At block 304, the application determines personality types and technical ability levels of the customers, based at least in part on the first set of inputs to the survey. At block 306, the application receives a second set of inputs, wherein the inputs are responses to a survey of customer service agents. At block 308, the application determines personality types of the customer service agents based at least in part on the second set of inputs. At block 310, the application determines a first preferred match of each of the customer personality types to the agent personality types. At block 312, the application performs customer service based on matching a first pre-defined fraction of customers to agents using the first preferred matches and matching a second pre-defined fraction of customers to agents using matches that are not preferred matches. At block 314, the application measures the success of customer service for preferred matches and non-preferred matches. At block 316, the application adapts matches between customer types and agent types based on the success measure of the matches. In an embodiment, the application may determine that some of the supposed not preferred personality types do work well with customers. These personality types that do work well even though they were initially considered not preferred are defined as complementary personality types, wherein complementary personality types are personality types that work well with customers, but are not the best personality types to match with customers. The application may do this so that in case a call center becomes extremely busy and does not have a corresponding personality type agent to match a customer with, it may select an agent with a complementary personality type to match with the customer.

Alternatively, the data may show that what was previously thought to be a non-preferred personality match or a non-corresponding match of personality types is a preferred or corresponding match of personality types now. It may be that earlier data was incomplete or misrepresentative. It may be that people have changed. At least in part, the rationale for deliberately promoting some pairing or matching of customers with agents having what are thought to be non-corresponding personalities is to experiment, to collect data from which to confirm or revise the existing understanding of personality type matches.

Figure 4:
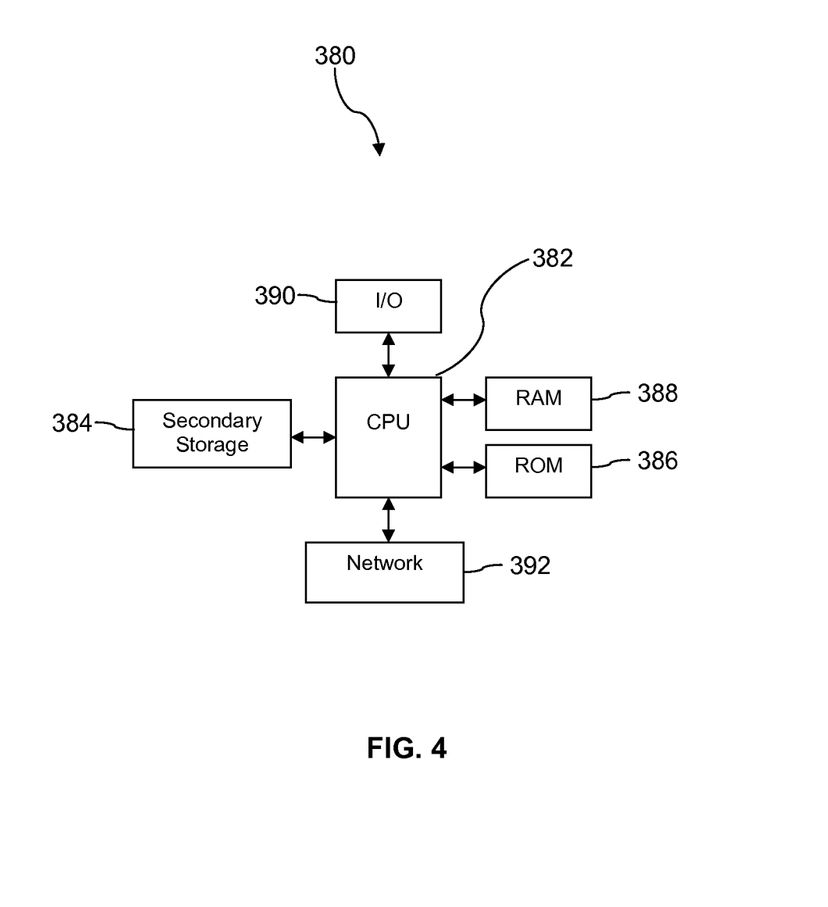
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

The I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of performing one or more customer service operation requests, comprising:

Receiving inputs by an application of an evaluation server, wherein the inputs are responses to a survey of a first user of a workstation, and wherein the survey is presented in a customer service web page;

Determining a personality type and a technical ability level of the first user by the application, based at least in part on the inputs to the survey;

receiving a user request by the customer service web page for a widget, wherein the widget is a user interface (UI) element widget that is located in another UI, wherein the widget provides functionality to complete the user request, and wherein the user request is related to an issue that the first user wants to resolve;

selecting the widget from a plurality of widgets by the application based on the technical ability level of the first user, and the issue that the first user wants to resolve, wherein the format of the selected widget is dependent upon the technical ability level of the first user, and wherein the selected widget is technologically complex if the first user has a high technical ability level, and when the selected widget is technologically complex, the selected widget comprises more options available to the first user than when the selected widget is technologically simple;

evaluating and formatting, by the evaluation server, the selected widget so that the selected widget is optimal for viewing by determining the end type first user UI, the first user's UI size, and the channel that the first user is using;

sending the selected widget by the application via the customer service web page to the workstation to configure a display of the workstation to display the selected widget to the first user in response to the selection of the widget from the plurality of widgets and the sending the selected widget to the workstation;

receiving second inputs by the application of the evaluation server, wherein the second inputs are responses to an evaluation survey of the first user of the workstation, wherein the evaluation survey is presented in the customer service web page, and wherein the evaluation survey measures a degree of success of the selected widget in completing the user request;

receiving third inputs by the application of the evaluation server, wherein the third inputs are responses to a second survey of a second user of a second workstation, and wherein the second survey is presented in a second customer service web page;

Determining a second personality type of the second user by the application, based at least in part on the third inputs to the second survey;

determining, by the application, a customer service agent having a third personality type that is a non-corresponding personality type of the second personality type of the second user, wherein the second user is matched with the customer service agent when the second user seeks customer service; and Modifying an association between the second personality type and the third personality type for subsequent customer care requests based on a degree of successful interaction between the second user and the customer service agent.

2. The method of claim 1, wherein the selected widget is technologically simple if the first user has a low technical ability level.

3. The method of claim 1, wherein formatting information is in the initial request sent by the first user.

4. The method of claim 1, wherein the issue that the first user wants to resolve is one of a phone return issue, a network issue, a device activation issue, or a proactive bill payment issue.

5. The method of claim 1, wherein each of the plurality of widgets that is associated with the issue that the first user wants to resolve corresponds to a different technical ability level of the first user.

6. The method of claim 1, further comprising receiving, by a customer service entity, communication from the first user for assistance when the selected widget does not complete the user request.

7. The method of claim 6, further comprising routing the communication from the first user to a customer service agent at least partially based on the determined personality of the first user.

8. The method of claim 1, wherein the third personality type is a non-corresponding personality type of the personality type of the second user because a person having the third personality type is not believed to work optimally in communications with a person having the second personality type of the second user.

9. The method of claim 1, further comprising receiving fourth inputs by the application of the evaluation server, wherein the fourth inputs are responses to a second evaluation survey of the second user of the second workstation, wherein the second evaluation survey is presented in the second customer service web page, and wherein the second evaluation survey measures a degree of success of interactions between the second user and the customer service agent to determine the degree of successful interaction.

* * * * *